(12) United States Patent
Koizumi et al.

(10) Patent No.: US 8,674,676 B2
(45) Date of Patent: Mar. 18, 2014

(54) POWER-SUPPLY CONTROL APPARATUS AND POWER-SUPPLY CONTROL METHOD

(75) Inventors: Tohru Koizumi, Kawasaki (JP); Kensuke Ishida, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/536,235

(22) Filed: Jun. 28, 2012

(65) Prior Publication Data

US 2012/0326692 A1 Dec. 27, 2012

Related U.S. Application Data

(63) Continuation of application No. PCT/JP2009/071816, filed on Dec. 28, 2009.

(51) Int. Cl.
*G05F 5/00* (2006.01)

(52) U.S. Cl.
USPC ............................................. 323/299

(58) Field of Classification Search
USPC .................. 323/266–272, 299, 303
See application file for complete search history.

(56) References Cited

U.S. PATENT DOCUMENTS

| 5,262,933 | A | * | 11/1993 | Shyi-Hon ..................... 363/49 |
| 6,775,161 | B1 | * | 8/2004 | Canova et al. ............... 363/132 |
| 7,437,258 | B2 | | 10/2008 | Robertson et al. |
| 7,541,797 | B2 | * | 6/2009 | Dequina et al. ............. 323/316 |
| 8,471,624 | B2 | * | 6/2013 | Bonsels et al. ............. 327/538 |
| 2001/0052762 | A1 | | 12/2001 | Tsuji |
| 2007/0205662 | A1 | | 9/2007 | Nakamura et al. |
| 2007/0242557 | A1 | | 10/2007 | Ozawa et al. |

FOREIGN PATENT DOCUMENTS

| JP | 1-292512 | 11/1989 |
| JP | 5-158572 | 6/1993 |
| JP | 5-276745 | 10/1993 |
| JP | 6-51875 | 2/1994 |
| JP | 7-12896 | 1/1995 |
| JP | 8-16260 | 1/1996 |
| JP | 2000-122575 | 4/2000 |
| JP | 2001-359273 | 12/2001 |
| JP | 2004-184111 | 7/2004 |
| JP | 2005-18763 | 1/2005 |
| JP | 2007-228702 | 9/2007 |
| JP | 2007-259659 | 10/2007 |

OTHER PUBLICATIONS

Japanese Office Action mailed Mar. 12, 2013 for corresponding Japanese Application No. 2011-547223.
International Search Report of Corresponding PCT Application PCT/JP2009/071816 mailed Mar. 16, 2010.

* cited by examiner

*Primary Examiner* — Matthew Nguyen
(74) *Attorney, Agent, or Firm* — Staas & Halsey LLP

(57) ABSTRACT

A power-supply control apparatus uses a margin setting unit to set the value of a margin that is added to a request voltage value VID1 of an electronic device, which dynamically changes the operation voltage. A margin adding unit calculates a control voltage value VID2 by adding the margin to the request voltage value VID1 and outputs the control voltage value VID2 to a power-supply apparatus. Therefore, the power-supply apparatus can supply a margin-included voltage value that is changed in accordance with a change in the operation voltage of the electronic device. Accordingly, it is possible to check the electronic device, which dynamically changes its operation voltage, by using a margin that is properly set.

8 Claims, 11 Drawing Sheets

POWER-SUPPLY CONTROL APPARATUS AND POWER-SUPPLY CONTROL METHOD

CROSS-REFERENCE TO RELATED APPLICATION

This application is a continuation of International Application No. PCT/JP2009/071816, filed on Dec. 28, 2009, the entire contents of which are incorporated herein by reference.

FIELD

The embodiments discussed herein are directed to a power-supply control apparatus and a power-supply control method.

BACKGROUND

Conventionally, electronic devices, such as CPUs (Central Processing Units), have a specified value for the driving voltage to be supplied during their operation. Therefore, a configuration is used in which an electronic device itself sends a signal indicative of the driving voltage to a power-supply apparatus and the power-supply apparatus supplies electric power at the specified voltage.

In some cases, the driving voltage margin is checked during the development stage or at the shipment stage of an electronic device. If the driving voltage margin is correct, the reliability of the electronic device is increased. This is because, for example, even when, due to a defect with a power-supply apparatus, the value of the actually supplied driving voltage is shifted from the specified voltage value that is requested by the electronic device, the electronic device is still operable.

Checking the driving voltage margin of an electronic device involves preparing a power supply with a voltage at a predetermined value higher than the voltage requested by the electronic device, preparing a power supply with a voltage at a predetermined value lower than the requested voltage value, supplying the driving voltages from these power supplies, and checking whether the electronic device operates properly when the driving voltages are supplied from the power supplies.

An example of a multi-voltage power-supply apparatus will be explained with reference to FIG. 14. FIG. 14 is a diagram of the configuration of a two-voltage power-supply apparatus. The power-supply apparatus illustrated in FIG. 14 includes an interface control unit 61, registers 62_1 to 62_3, an adder 63, and power supplies 64, 65.

The interface control unit 61 writes a value that corresponds to a first voltage to the register 62_1. The interface control unit 61 also writes a value that corresponds to the difference between the first voltage and a second voltage to the register 62_2.

The adder 63 writes the sum of the value written on the register 62_1 and the value written on the register 62_2 to the register 62_3. Therefore, the register 62_3 holds the value that corresponds to the second voltage.

The power supply 64 outputs a voltage that corresponds to the value read from the register 62_1, i.e., outputs the first voltage. The power supply 65 outputs a voltage that corresponds to the value read from the register 62_3, i.e., outputs the second voltage. With the configuration illustrated in FIG. 14, the interface control unit can control different voltage values and maintain the difference between the voltages.

Patent Literature 1: Japanese Laid-open Patent Publication No. 2007-228702

Patent Literature 2: Japanese Laid-open Patent Publication No. 2007-259659

Patent Literature 3: Japanese Laid-open Patent Publication No. 05-276745

Electronic devices have been known that change a request voltage value in accordance with the operational state thereof. The purpose of a dynamic change in the voltage by an electronic device is to save power. For example, a CPU that dynamically changes the voltage decreases the operation clock speed thereof and then lowers the voltage by issuing a voltage change instruction to a power-supply apparatus. The CPU increases the voltage by issuing a voltage change instruction to the power-supply apparatus and then increases the operation clock speed thereof.

The problem with the conventional technology is that it is impossible to check the driving voltage margin of an electronic device that dynamically changes its voltage. Even when two or more voltages are generated with the conventional configuration described above, the value of the voltage used during a check is fixed. When an electronic device changes the request voltage during the check, the supplied voltage is not changed; therefore, the supplied voltage is too high or too low for the changed request voltage even though the margin is included. As described above, with the conventional technology, it is impossible to set a margin voltage value that is appropriate for an electronic device that dynamically changes its operation voltage.

SUMMARY

According to an aspect of an embodiment of the invention, a power-supply control apparatus includes an additional-voltage setting unit that sets an additional voltage value, wherein the additional voltage value is added to a request voltage value that is output from an electronic device, and an adding unit that calculates a control voltage value by adding the additional voltage value to the request voltage value and outputs the control voltage value to a power-supply apparatus, wherein the power-supply apparatus supplies a driving voltage to the electronic device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. It is noted that the disclosed technology is not limited to the following embodiments.

[a] First Embodiment

Figure 1:
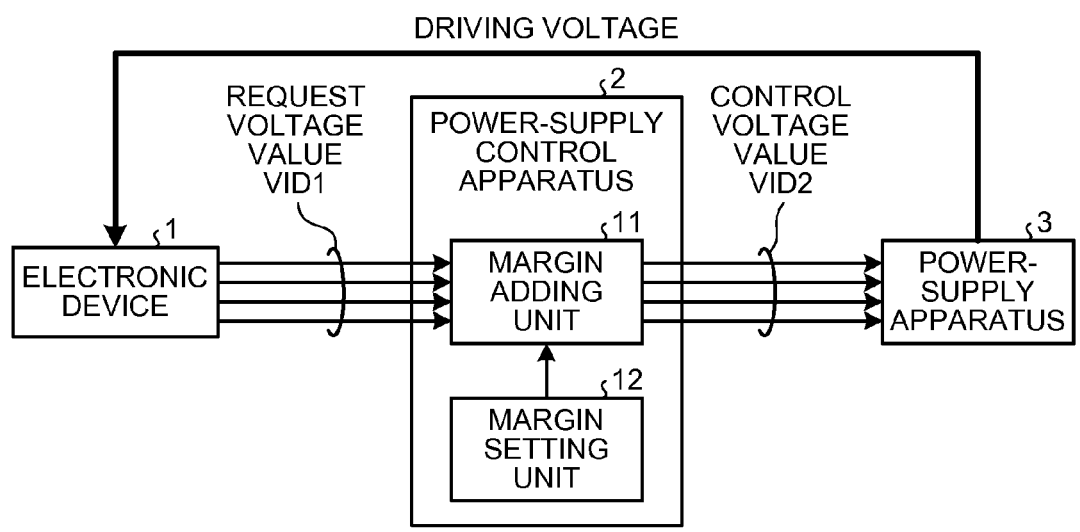
FIG. 1 is a diagram of the configuration of the power-supply control apparatus according to the first embodiment.

FIG. 1 is a diagram of the configuration of the power-supply control apparatus according to the first embodiment. A power-supply control apparatus 2 illustrated in FIG. 1 is connected to an electronic device 1 and a power-supply apparatus 3. The electronic device 1 operates by an electric power received from the power-supply apparatus 3. The electronic device 1 outputs a request voltage value VID (VID: Voltage ID) 1 as a signal indicative of the driving voltage thereof.

The power-supply control apparatus 2 includes a margin adding unit 11 and a margin setting unit 12. The margin setting unit 12 sets an additional voltage value as a margin. The additional voltage value is added to the request voltage value VID1, which is output from the electronic device 1. The margin adding unit 11 adds the setting value or the margin to the request voltage value VID1, thereby calculating a control voltage value VID2 and outputs the control voltage value VID2 to the power-supply apparatus 3.

The power-supply apparatus 3 supplies the driving voltage to the electronic device 1 based on the control voltage value VID2. In other words, the power-supply apparatus 3 supplies the driving voltage in accordance with the request voltage value VID1, which is output from the electronic device 1, added with a value that is set as the margin.

Therefore, when the electronic device 1 changes the request voltage value VID1, the margin is added to the new request voltage value VID1 and the driving voltage is also changed in accordance with the change in the request voltage value VID1.

If the additional voltage value is positive, when the additional voltage is added to the request voltage value VID1, the control voltage value VID2 is calculated to a value greater than the request voltage value VID1 and the electronic device 1 receives a driving voltage greater than the request voltage. On the other hand, if the additional voltage value is negative, when the additional voltage is added to the request voltage value VID1, the control voltage value VID2 is calculated to a value less than the request voltage value VID1 and the electronic device 1 receives a driving voltage less than the request voltage.

As described above, the power-supply control apparatus according to the first embodiment generates the control voltage value VID2 by adding the margin to the request voltage value VID1 of the electronic device 1 and outputs the control voltage value VID2 to the power-supply apparatus 3. Therefore, it is possible to supply a voltage at a margin-included value that is changed in accordance with a change in the operation voltage of the electronic device. Therefore, in a screening test before shipment, i.e., a graded test, a yield ratio is expected that is higher than a test using a fixed margin.

[b] Second Embodiment

Figure 2:
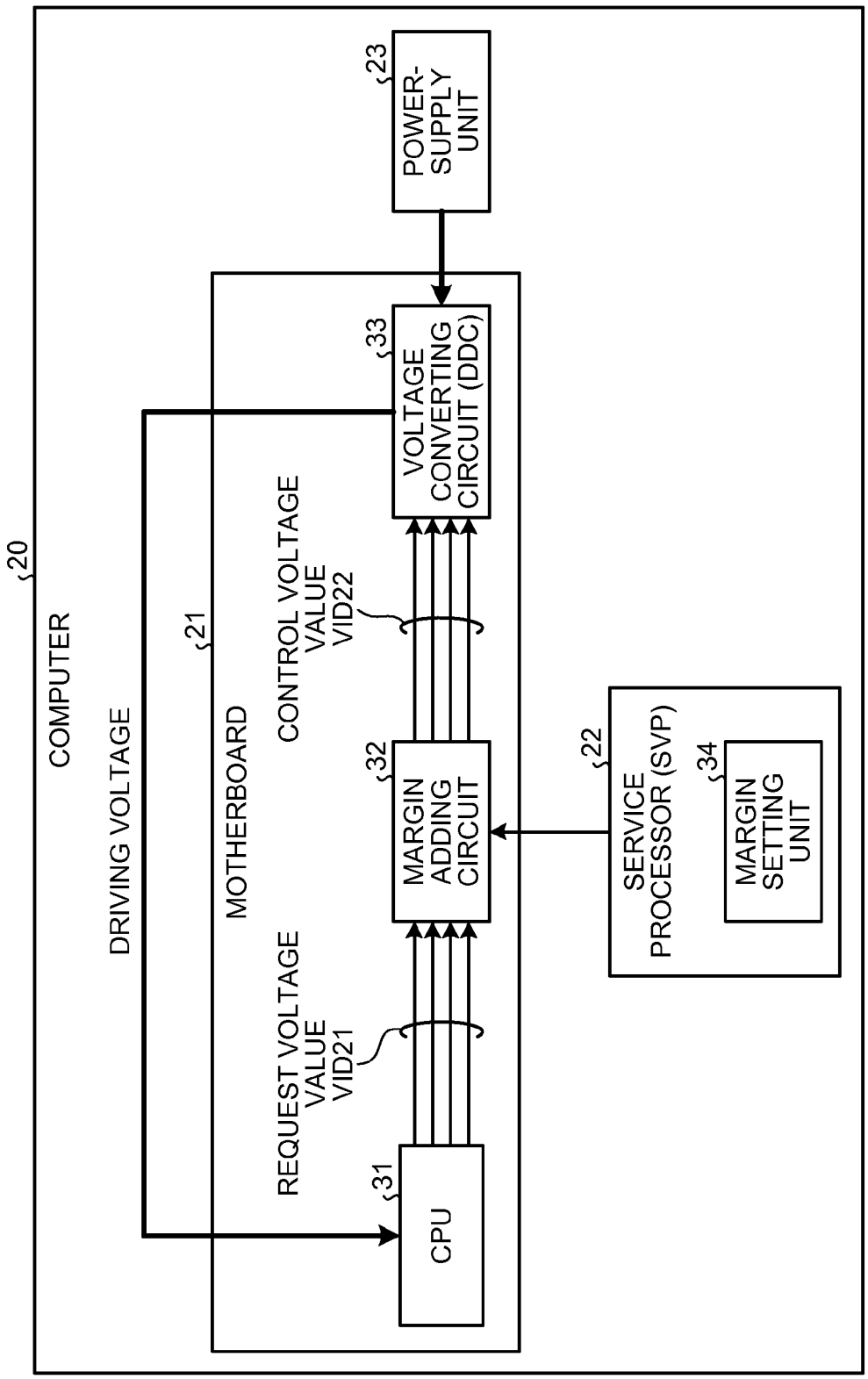
FIG. 2 is a diagram of the configuration of the computer according to the second embodiment.

FIG. 2 is a diagram of the configuration of the computer according to the second embodiment. A computer 20 illustrated in FIG. 2 includes a motherboard 21, a service processor (SVP) 22, and a power-supply unit 23.

The service processor 22 is a processor that performs general management of the computer 20. The service processor 22 monitors the operational state of each unit included in the computer 20 and switches the power supply to ON and OFF. The service processor 22 includes a margin setting unit 34 inside. The power-supply unit 23 is a device that supplies an electric power to each unit included in the computer 20.

The motherboard 21 includes therein a central processing unit (CPU) 31, which an electronic device, a margin adding circuit 32, and a voltage converting circuit (DC to DC Converter: DDC) 33.

The CPU 31 operates by an electric power received from the voltage converting circuit 33. The electronic device 1 outputs a request voltage value VID21 as a signal indicative of the driving voltage thereof.

The margin adding circuit 32 is implemented with, for example, a logic device. The margin adding circuit 32 adds a margin or a setting value to the request voltage value VID21, thereby calculating a control voltage value VID22 and outputs the control voltage value VID22 to the voltage converting circuit 33. The value of the margin is set by the margin setting unit 34 included in the service processor 22.

The voltage converting circuit 33 converts a voltage that is output from the power-supply unit 23 in accordance with the control voltage value VID22 and then supplies it as the driving voltage to the CPU 31. In other words, the voltage converting circuit 33 supplies the driving voltage in accordance with the request voltage value VID21, which is output from the CPU 31, added with a value that is set as the margin.

Therefore, when the CPU 31 changes the request voltage value VID21, the margin is added to the new request voltage value VID21 and the driving voltage is also changed in accordance with the change in the request voltage value VID21.

If the additional voltage value is positive, when the additional voltage is added to the request voltage value VID21, the control voltage value VID22 is calculated to a value greater than the request voltage value VID21 and the CPU 31 receives a driving voltage greater than the request voltage. On the other hand, if the additional voltage value is negative, when the additional voltage is added to the request voltage value VID21, the control voltage value VID22 is calculated to a value less than the request voltage value VID21 and the CPU 31 receives a driving voltage less than the request voltage.

Figure 3:
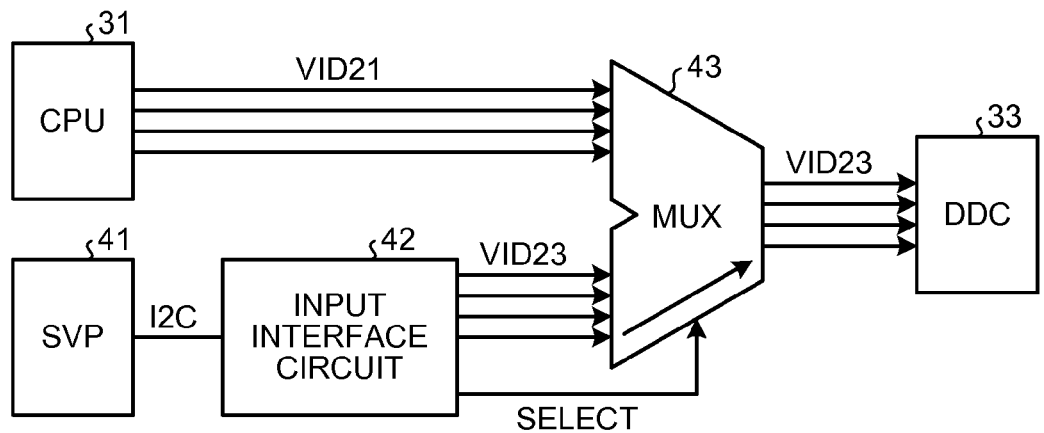
FIG. 3 is a diagram that explains the comparative configuration according to the second embodiment.

FIG. 3 is a diagram that explains the comparative configuration according to the second embodiment. With the configuration illustrated in FIG. 3, the request voltage value VID21 output from the CPU 31 is input to a multiplexer (MUX) 43. An SVP 41, which is a service processor, sets the value of a voltage used for a margin check in a fixed manner and outputs the value. In the example of FIG. 3, the SVP 41 outputs the value of the voltage used for a margin check by using I2C (Inter-Integrated Circuit) communications.

An input interface circuit 42 inputs the value of the voltage used for a margin check, which is output from the SVP 41, to the multiplexer 43 as a check voltage value VID23. The input interface circuit 42 also inputs a select signal to the multiplexer 43 to switch the multiplexer 43.

The multiplexer 43 selects either the request voltage value VID21 or the check voltage value VID23 and outputs the selected voltage value to the voltage converting circuit 33. As described above, with the configuration illustrated in FIG. 3, because the check voltage value VID23 is fixed, it is impossible to change the check voltage value VID23 accordingly when the request voltage value VID21 of the CPU 31 is changed.

Figure 4:
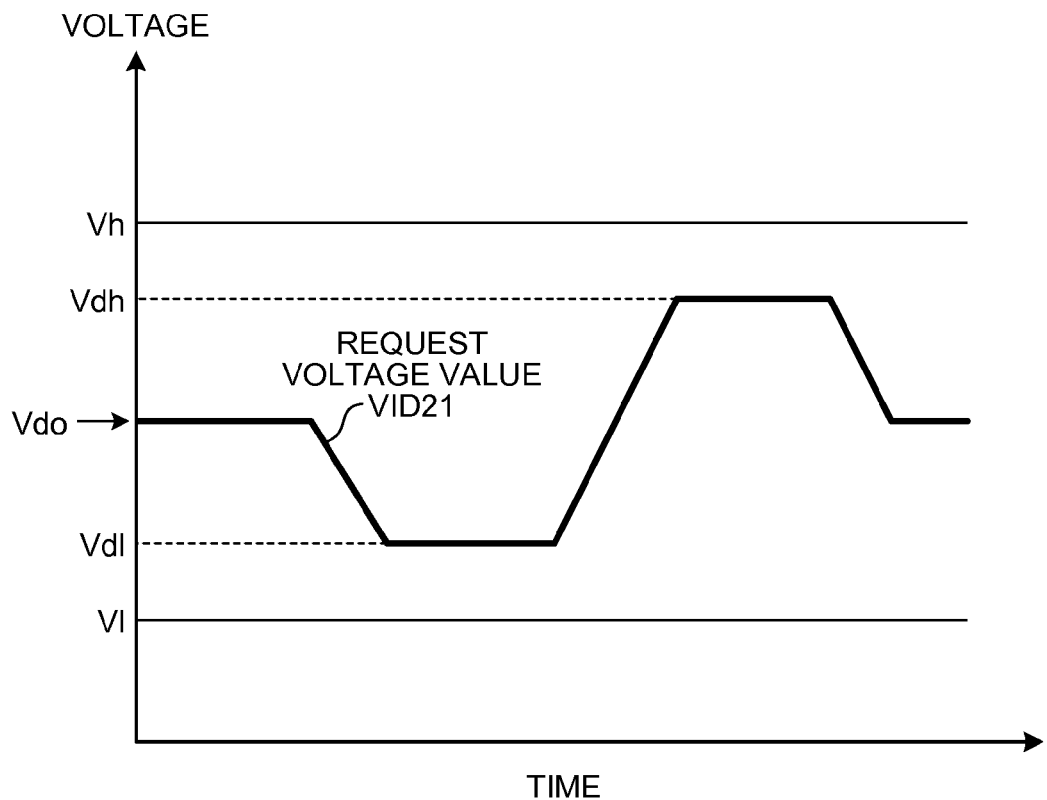
FIG. 4 is a graph that illustrates change in the request voltage of the CPU and check voltages.

FIG. 4 is a graph that illustrates change in the request voltage value VID21 of the CPU 31 and check voltages. The default value of the request voltage value VID21 of the CPU 31 is a voltage Vdo, a check voltage greater than the voltage Vdo is a voltage Vh, and a check voltage less than the voltage Vdo is a voltage Vl.

As described above, the CPU 31 changes the request voltage in accordance with the operational state thereof. If the request voltage value VID21 of the CPU 31 is changed from the voltage Vdo to a voltage Vdl while the check voltage Vh is being supplied as a high margin voltage, the difference between the voltage Vh and the voltage Vdl increases. As a result, a voltage that is too high for the voltage specified by the CPU 31 is supplied to the CPU 31 and the possibility of the occurrence of an operational default in the CPU 31 increases.

Similarly, If the request voltage value VID21 of the CPU 31 is changed from the voltage Vdo to a voltage Vdh while the check voltage Vl is being supplied as a low margin voltage, the difference between the voltage Vl and the voltage Vdh increases. As a result, a voltage that is too low for the voltage specified by the CPU 31 is supplied to the CPU 31 and the possibility of preventing the CPU 31 from a normal operation increases.

As illustrated in FIG. 4, if the values of the check voltages Vh, Vl are fixed, i.e., the margin of the voltage is set in a fixed manner, there is the possibility that a change in the request voltage value VID21 increases the difference away from the check voltage and the CPU 31 cannot operate properly.

Figure 5:
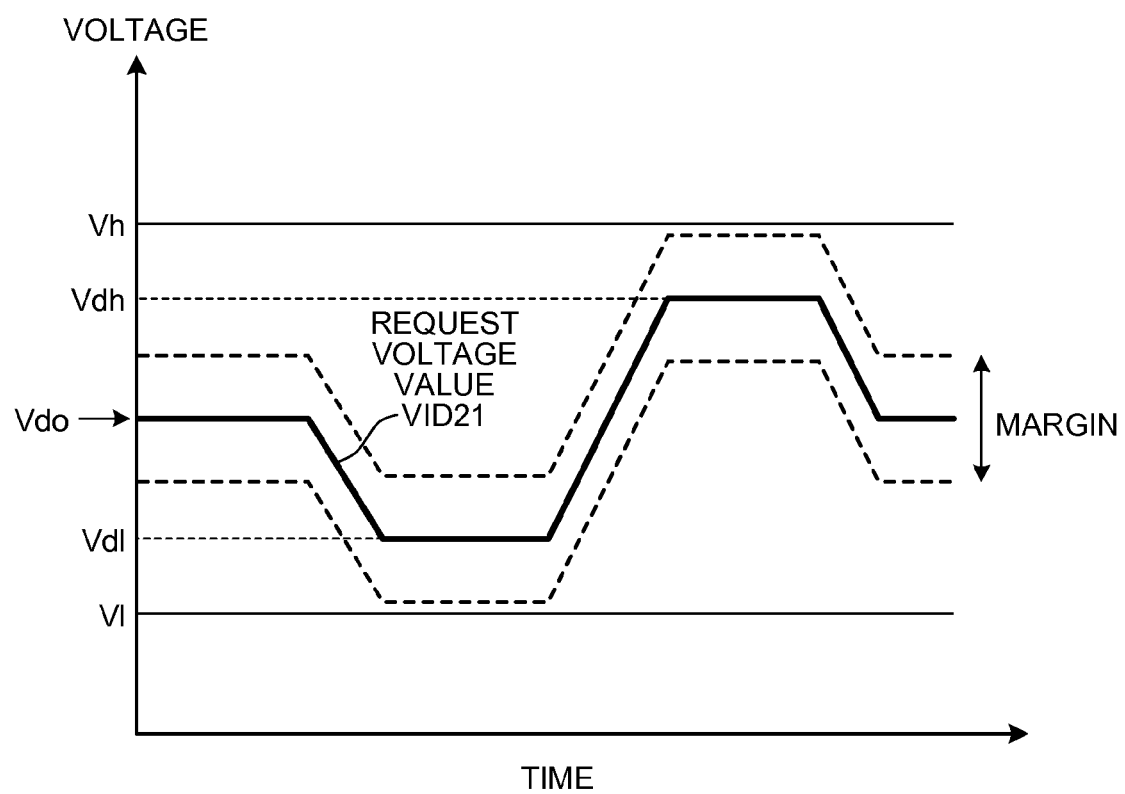
FIG. 5 is a diagram that explains voltage control by the margin adding circuit according to the second embodiment.

FIG. 5 is a diagram that explains voltage control by the margin adding circuit according to the second embodiment. The margin adding circuit 32 generates the control voltage value VID22 by adding a margin to the request voltage value VID21 received from the CPU 31. Therefore, when the request voltage value VID21 of the CPU 31 is changed from the default value or the voltage Vdo to the voltage Vdl or the voltage Vdh, the check voltage is changed in accordance with the change in the request voltage value VID21 with the margin being taken into consideration.

As illustrated in FIG. 5, the value of the margin of the request voltage value VID21, i.e., a value added to or subtracted from the request voltage value VID21 is fixed. Therefore, even when the request voltage value VID21 of the CPU 31 is changed, it is possible to check the CPU 31 by supplying, to the CPU 31, a driving voltage that has a margin appropriate for the request voltage value VID21.

Figure 6:
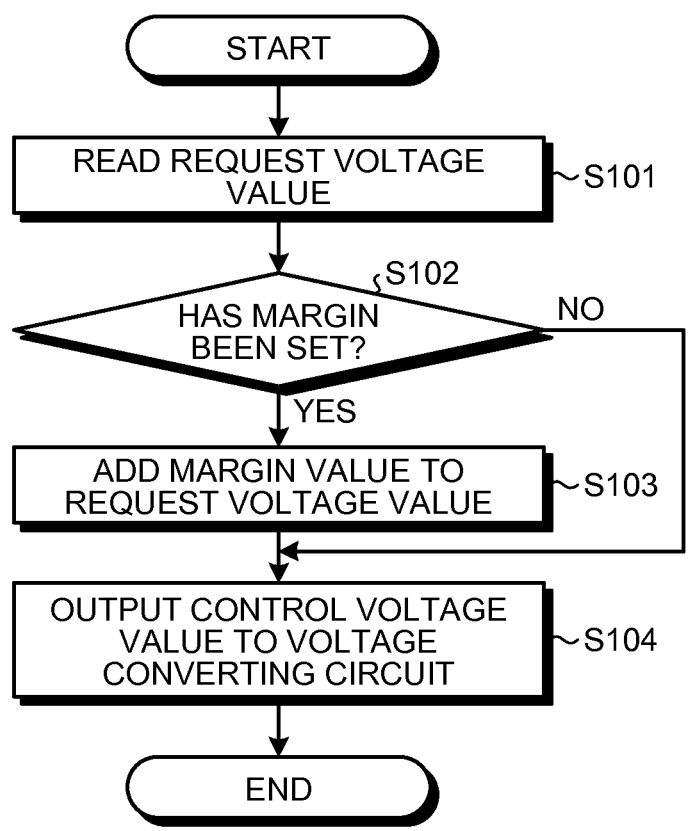
FIG. 6 is a flowchart of processing operation of the margin adding circuit according to the second embodiment.

FIG. 6 is a flowchart of processing operation of the margin adding circuit according to the second embodiment. First, the margin adding circuit 32 reads a request voltage value output from the CPU 31 (S101). Then, the margin adding circuit 32 determines whether a margin has been set by the margin setting unit 34 (S102).

If it is determined that a margin has been set (S102, Yes), the margin adding circuit 32 adds the value of the set margin to the request voltage value (S103). The value of the margin can be either positive or negative.

The margin adding circuit 32 outputs the sum to the voltage converting circuit 33 as a control voltage value (S104) and the process control goes to end. If a margin has not been set (S102, No), the margin adding circuit 32 outputs the request voltage value unchanged to the voltage converting circuit 33 as a control voltage value (S104) and the process control goes to end.

As described above, the computer 20 according to the second embodiment functions as a power-supply control apparatus in which the service processor 22 sets a margin, the margin adding circuit 32 adds the margin to the request voltage value VID21 of the CPU 31 and outputs the sum to the voltage converting circuit 33. Therefore, a voltage is supplied at a margin-included value that is changed in accordance with a change in the operation voltage of the CPU 31. Therefore, it is possible to check the CPU 31, which dynamically changes the operation voltage, by using a margin that is properly set.

Moreover, because the margin adding circuit 32 is configured as hardware by using logic devices, such as a CPLD (Complex Programmable Logic Device) and an FPGA (Field Programmable Gate Array), a high-speed change is enabled in accordance with a change in the voltage of the CPU 31.

[c] Third Embodiment

Figure 7:
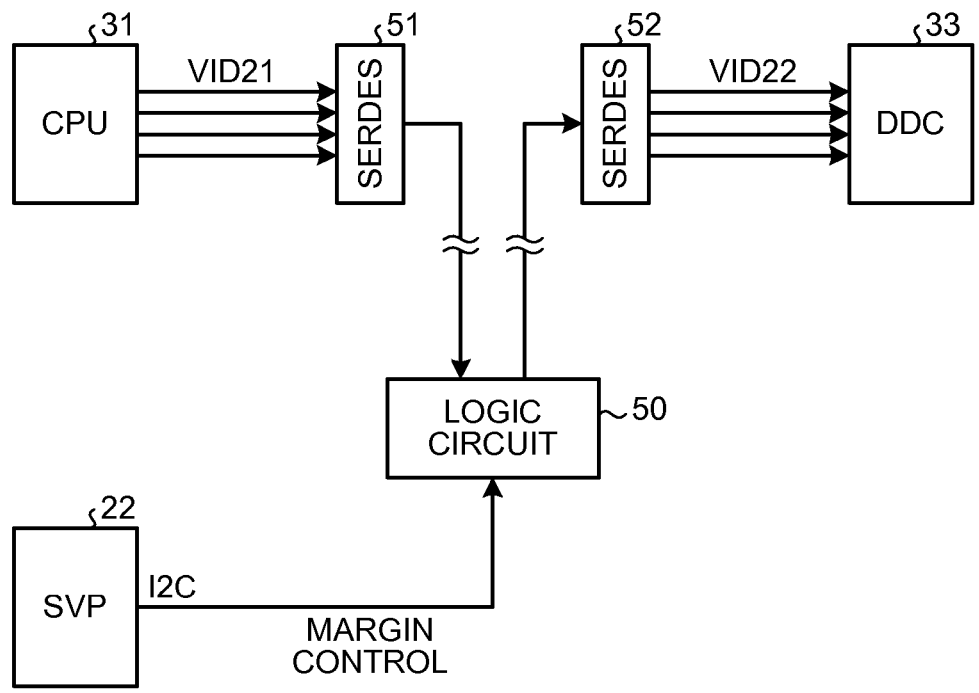
FIG. 7 is a diagram that explains the computer according to the third embodiment.

FIG. 7 is a diagram that explains the computer according to the third embodiment. The computer illustrated in FIG. 7 includes the CPU 31, the SVP 22, which is a service processor, a logic circuit 50, an SERDES (SERializer/DESerializer) 51, an SERDES 52, and the voltage converting circuit 33.

The SERDES 51 converts the request voltage value VID21, which is output from the CPU 31 as a parallel signal, into a serial signal and then outputs the serial signal to the logic circuit 50. The service processor 22 outputs a margin setting value to the logic circuit 50 by using I2C communications.

The logic circuit 50 adds the margin setting value, which is output from the service processor 22 to the request voltage value, which is output from the SERDES 51, and outputs the sum to the SERDES 52 as a serial signal. The SERDES 52 converts the value that is output from the logic circuit 50 as a serial signal into a parallel signal and then outputs the parallel signal to the voltage converting circuit 33.

The computer according to the third embodiment functions as a power-supply control apparatus in which the service processor 22 sets a margin, the logic circuit 50 adds the margin to the request voltage value VID21 of the CPU 31 and outputs the sum to the voltage converting circuit 33. Therefore, a voltage is supplied at a margin-included value that is changed in accordance with a change in the operation voltage of the CPU 31. Therefore, it is possible to check the CPU 31, which dynamically changes the operation voltage, by using a margin that is properly set.

Moreover, the SERDES 51 is inserted between the CPU 31 and the logic circuit 50 and the SERDES 52 is inserted between the logic circuit 50 and the DDC 33. Therefore, the degree of freedom in arranging the logic circuit 50 is increased and it is possible to reduce the number of input/output pins of the logic circuit 50.

[d] Fourth Embodiment

Figure 8:
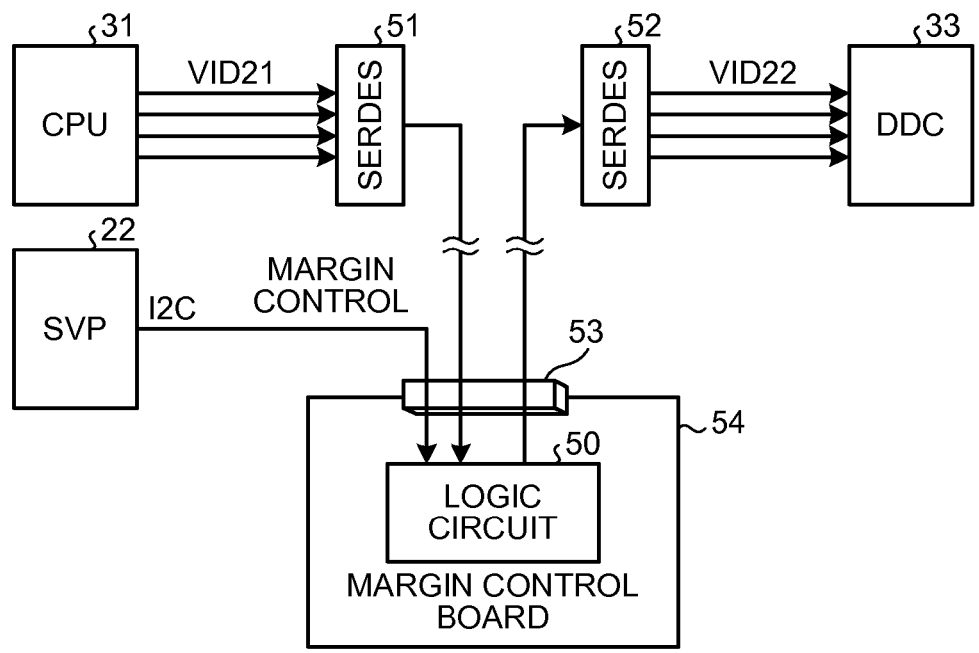
FIG. 8 is a diagram that explains the computer according to the fourth embodiment.

FIG. 8 is a diagram that explains the computer according to the fourth embodiment. The computer illustrated in FIG. 8 is different from the computer of the third embodiment in that the logic circuit 50 is mounted on a margin control board 54 and a connector 53 is provided so that the margin control board 54 is attached to the computer in a detachable manner.

The other components and the operations are the same as those of the third embodiment. The same components are denoted with the same numerals and the explanation is not repeated.

The logic circuit 50 is connected to the SVP22, which is a service processor, the SERDES 51, and the SERDES 52 via the connector 53 in a detachable manner. In general, the logic circuit 50, which controls a margin, is used at a factory acceptance test, but is not used after shipment. Cost reduction is possible by replacing the margin control board 54 with a pass-through board.

Figure 9:
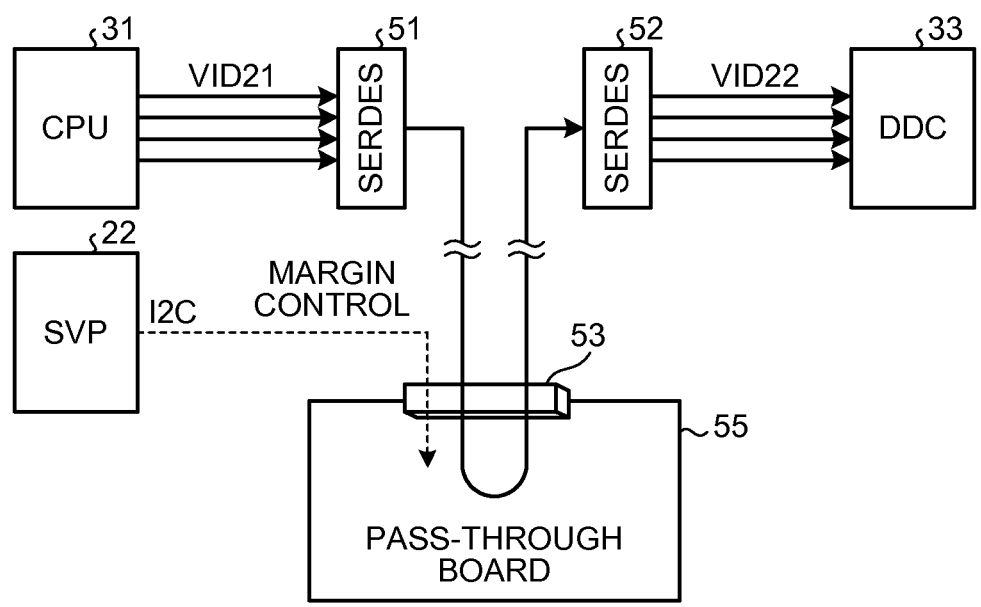
FIG. 9 is a diagram that explains the computer after replacement and attachment of a pass-through board according to the fourth embodiment.

FIG. 9 is a diagram that explains the computer after replacement and attachment of a pass-through board according to the fourth embodiment. As illustrated in FIG. 9, a pass-through board 55 sends a signal that is output from the SERDES 51 to the SERDES 52, unchanged. Therefore, the control voltage value VID22 is equal to the request voltage value VID21. It is noted that because the SVP 22 is used for not only margin setting but also monitoring the operational state of each unit included in the computer and switching a power supply to ON and OFF, the SVP 22 still remains in the computer.

The computer according to the fourth embodiment has not only the effects of the third embodiment but also an effect of cost reduction because the logic circuit 50, which adds a margin to a request voltage value, is detachable.

[e] Fifth Embodiment

Figure 10:
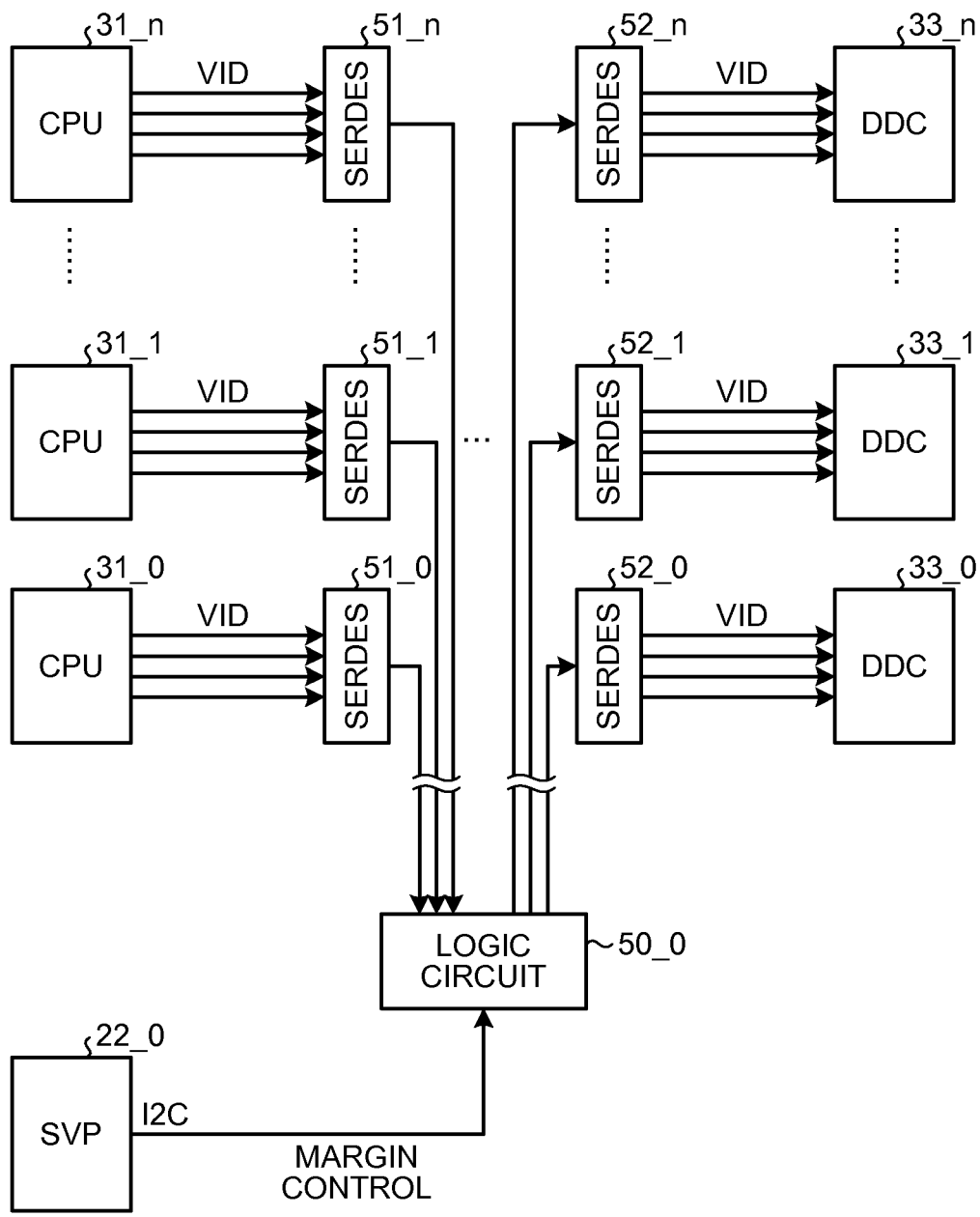
FIG. 10 is a diagram that explains the computer according to the fifth embodiment.

FIG. 10 is a diagram that explains the computer according to the fifth embodiment. The computer illustrated in FIG. 10 includes CPUs 31_0 to 31_n, an SVP 22_0, which is a service processor, a logic circuit 50_0, SERDES (SERializer/DESerializer) 51_0 to 51_n, 52_0 to 52_n, and DDCs 33_0 to 33_n, which are voltage converting circuits.

The DDCs 33_0 to 33_n correspond to the CPUs 31_0 to 31_n, respectively. Similarly, the SERDESes (SERializers/DESerializers) 51_0 to 51_n correspond to the CPUs 31_0 to 31_n, respectively and the SERDESes 52_0 to 52_n correspond to the CPUs 31_0 to 31_n, respectively.

The logic circuit 50_0 adds a margin setting value that is output from the service processor 22_0 to a request voltage value output from each of the SERDESes 51_0 to 51_n and outputs the sums to the respective SERDESes 52_0 to 52_n.

The SVP 22_0 can set different margins or the same margin to the CPUs 31_0 to 31_n.

The computer according to the fifth embodiment has not only the effects of the third embodiment but also an effect of allowing a single logic circuit or the logic circuit 50_0 to set margins of the driving voltages of multiple CPUs or the CPUs 31_0 to 31_n. Moreover, because the number of input/output pins of the logic circuit 50 is reduced by using the SERDESes, a decrease in the degree of arrangement freedom is prevented and an increase in the size of the logic circuit 50 due to the number of pins is also prevented.

[f] Sixth Embodiment

Figure 11:
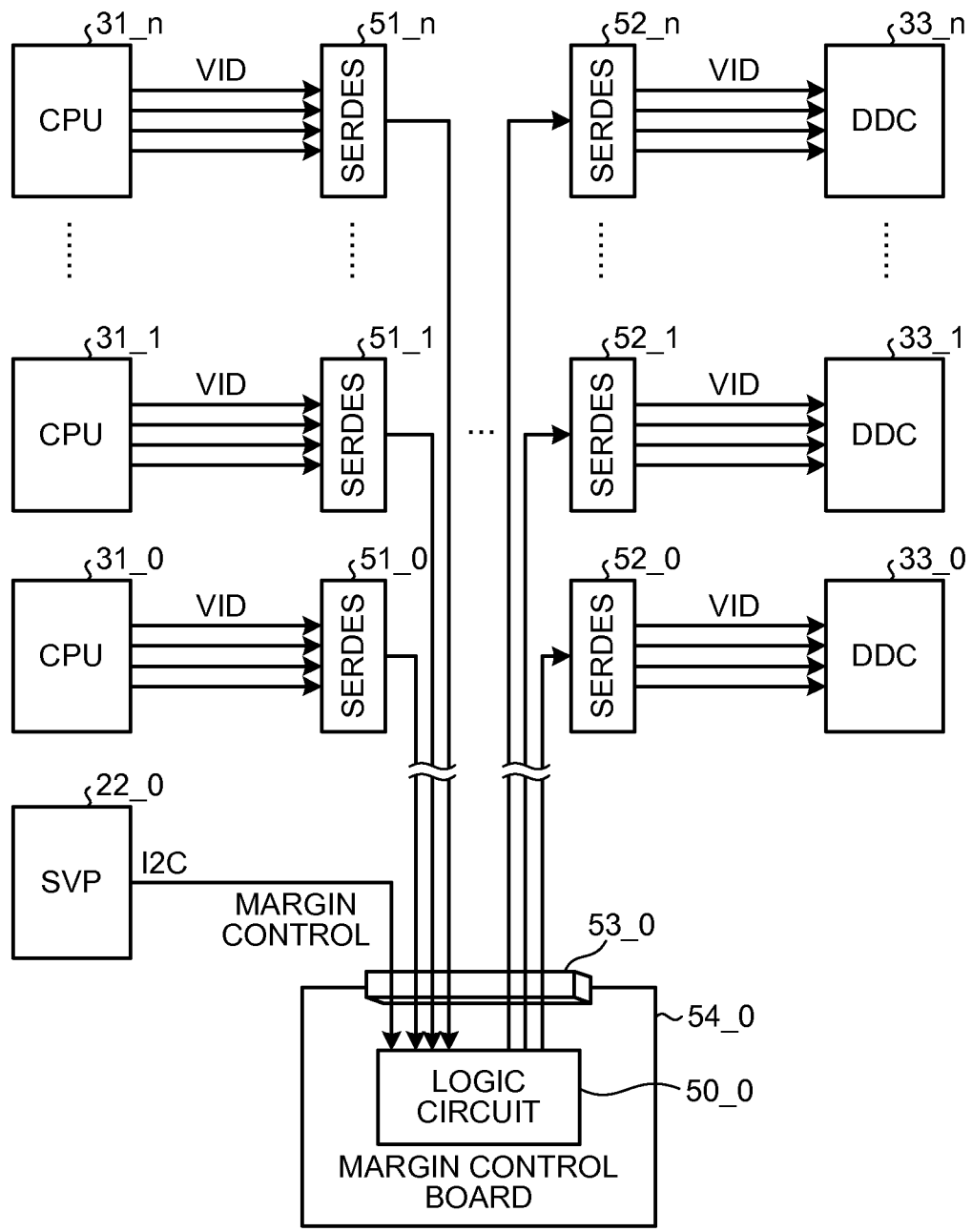
FIG. 11 is a diagram that explains the computer according to the sixth embodiment.

FIG. 11 is a diagram that explains the computer according to the sixth embodiment. The computer illustrated in FIG. 11 is different from the computer of the fifth embodiment in that the logic circuit 50_0 is mounted on a margin control board 54_0 and a connector 53_0 is provided so that the margin control board 54_0 is attached to the computer in a detachable manner. The other components and the operations are the same as those of the fifth embodiment. The same components are denoted with the same numerals and the explanation is not repeated.

The logic circuit 50_0 is connected to the SVP 22_0, which is a service processor, and the SERDESes 51_0 to 51_n, 52_1 to 52_n via the connector 53_0 in a detachable manner. In general, the logic circuit 50_0, which controls a margin, is used at a factory acceptance test, but in not used after shipment. Cost reduction is possible by replacing the margin control board 54_0 with a pass-through board.

Figure 12:
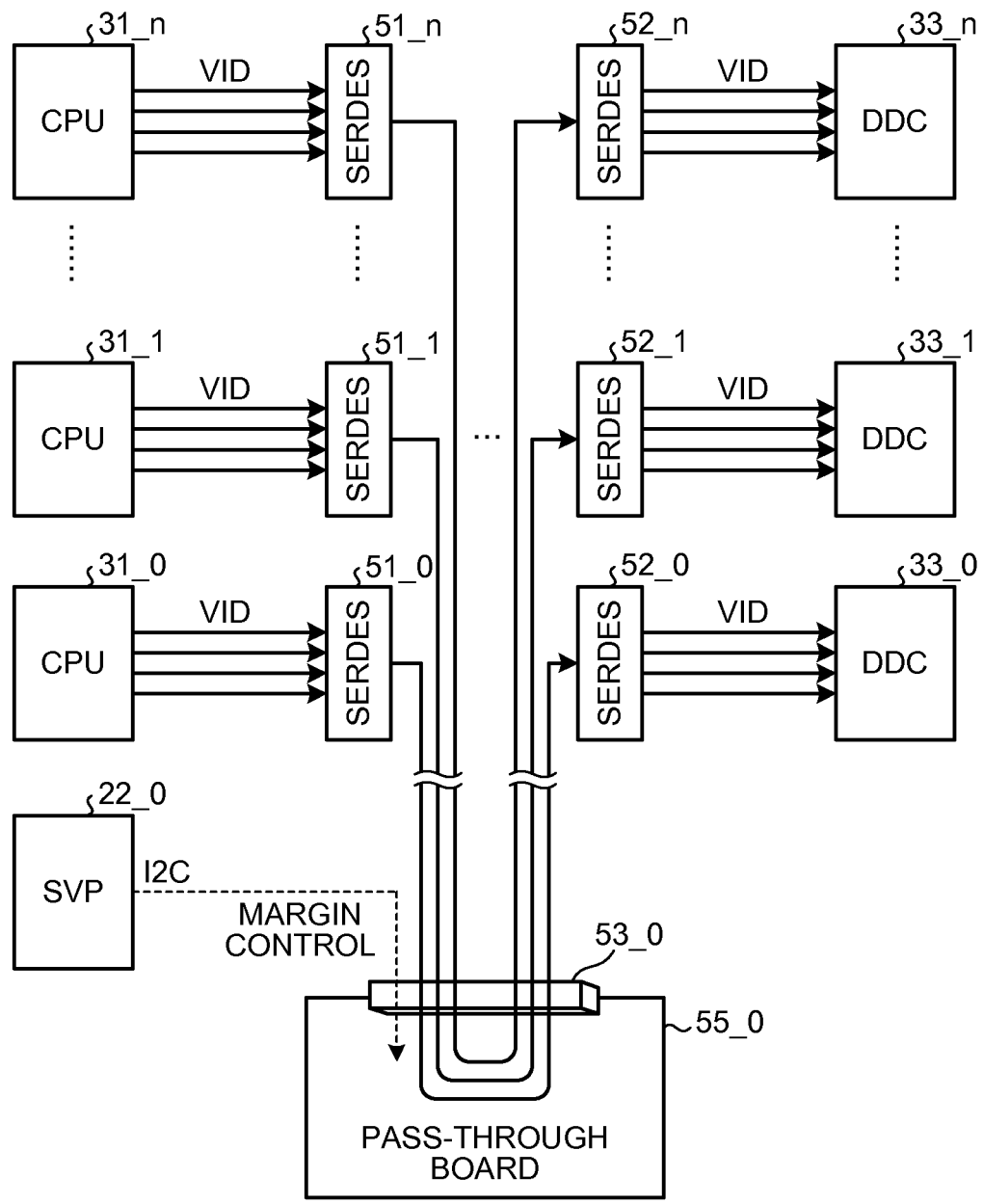
FIG. 12 a diagram that explains the computer after replacement and attachment of a pass-through board according to the sixth embodiment.

FIG. 12 a diagram that explains the computer after replacement and attachment of a pass-through board according to the sixth embodiment. As illustrated in FIG. 12, a pass-through board 55_0 sends signals that are output from the SERDESes 51_0 to 51_n to the respective SERDESes 52_1 to 52_n, unchanged. Therefore, the request voltage values output from the CPUs 31_0 to 31_n are input to the respective DDCs 33_0 to 33_n.

The computer according to the sixth embodiment has not only the effects of the fifth embodiment but also an effect of cost reduction because the logic circuit 50_0, which adds a margin to a request voltage value, is detachable.

[g] Seventh Embodiment

Figure 13:
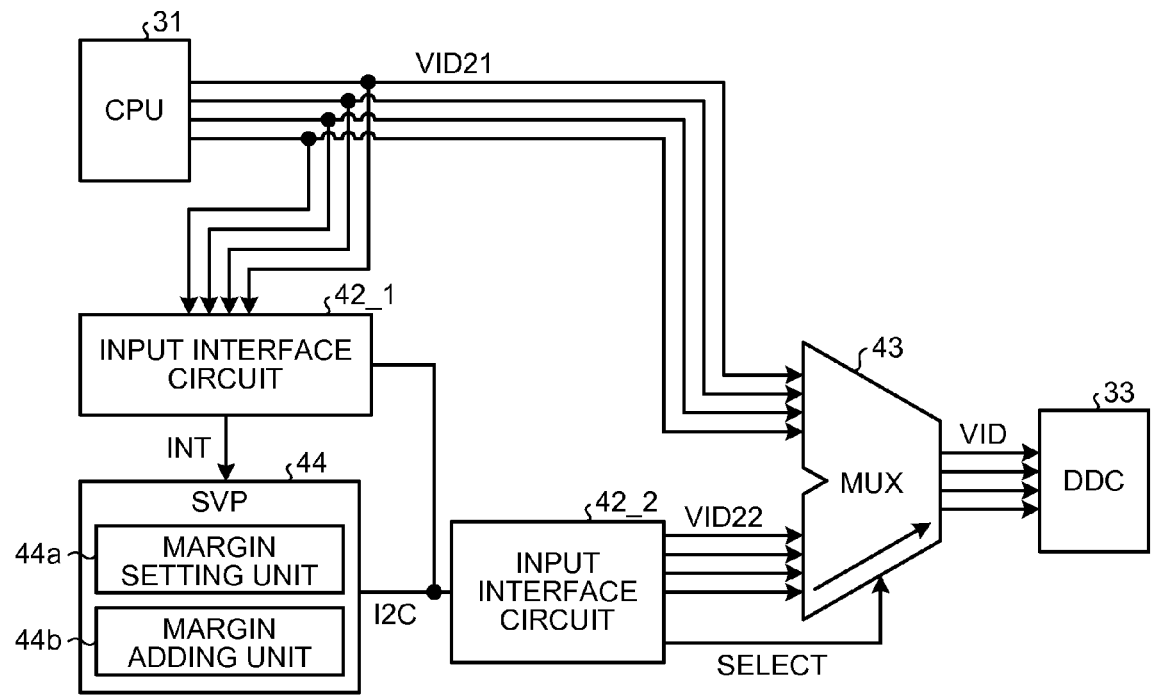
FIG. 13 is a diagram that explains the computer according to the seventh embodiment.
Figure 14:
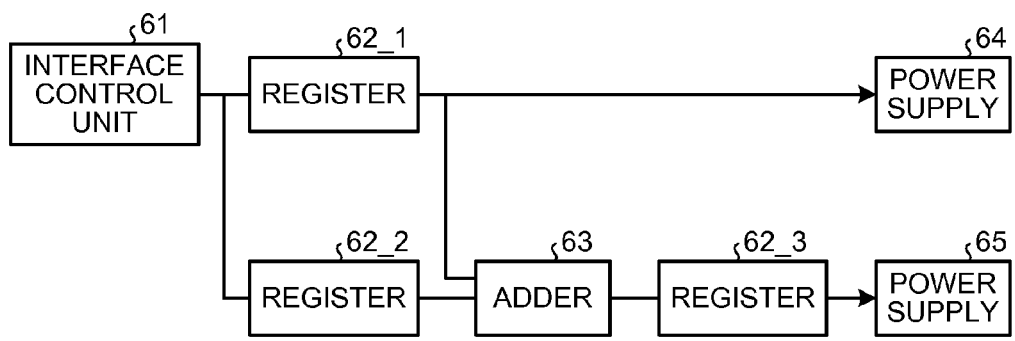
FIG. 14 is a diagram of the configuration of a two-voltage power-supply apparatus.

FIG. 13 is a diagram that explains the computer according to the seventh embodiment. The computer illustrated in FIG. 13 inputs the request voltage value VID21 of the CPU 31 to both an input interface circuit 42_1 and the multiplexer 43. Upon receiving the request voltage value VID21 as a parallel signal, the input interface circuit 42_1 converts the parallel signal into a serial signal and sends the serial signal to an SVP 44.

The SVP 44 includes therein a margin setting unit 44a and a margin adding unit 44b. The margin setting unit 44a is a processing unit that sets the value of a margin to be added to the request voltage value VID21, which is output from the CPU 31. The margin adding unit 44b adds the margin set by the margin setting unit 44a to the request voltage value VID21, thereby calculating the control voltage value VID22 and outputs the control voltage value VID22 to an input interface 42_2 by using I2C communications.

Upon receiving the control voltage value VID22 from the SVP 44 as a serial signal, the input interface 42_2 converts the serial signal into a parallel signal and outputs the parallel signal to the multiplexer 43. The input interface 42_2 also inputs a select signal to the multiplexer 43 to switch the multiplexer 43.

The multiplexer 43 selects either the request voltage value VID21 or the control voltage value VID22 and outputs the selected voltage value to the voltage converting circuit 33. As described above, with the configuration illustrated in FIG. 13, the SVP 44 calculates, using software, the control voltage value VID22 in accordance with a change in the request voltage value VID21 and inputs the control voltage value VID22 to the voltage converting circuit 33.

If the voltage change speed of the CPU 31, which is an electronic device, is sufficiently slow; a configuration of monitoring, in this manner, a voltage change of the CPU by the SVP 44 is applicable. When the request voltage value VID21 is changed, interrupt to the SVP 44 is raised and the SVP 44 performs an interrupt process and recognizes the changed request voltage value. Then, the SVP 44 adds a margin to the changed request voltage value, thereby generating a new control voltage value and inputs the new control voltage value to the voltage converting circuit 33.

If the voltage change speed of the CPU 31 is fast, configurations of performing an adding process using hardware are preferable. This is because even if a voltage change is notified by INT, a request voltage value is read via a low-speed I2C bus and a signal is output via I2C to reflect a change in the request voltage value.

A computer according to the seventh embodiment is effective when the voltage change speed of the CPU 31 is slower than the I2C communication speed and it is possible to supply a voltage at a margin-included value that is changed in accordance with a change in the operation voltage of the request voltage value VID1 of the CPU 31. Therefore, it is possible to check an electronic device that dynamically changes the operation voltage by using a margin that is properly set.

The apparatuses and the methods disclosed in the first to the seventh embodiments are merely examples. The present invention can be embodied by appropriately modifying any of the configurations and the operations. For example, although a CPU is used as an example of the electronic device in the second to the seventh embodiments, the apparatuses and the methods disclosed in the first to the seventh embodiments are applicable for an arbitrary device that changes an operation voltage.

According to an apparatus and a method disclosed in the present application, it is possible to provide a power-supply control apparatus and a power-supply control method capable of setting a margin-included voltage value suitable for an electronic device that dynamically changes its operation voltage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power-supply control apparatus comprising:
an additional-voltage setting unit that sets an additional voltage value added to a request voltage value that is output from an electronic device; and
an adding unit that calculates a control voltage value by adding the additional voltage value to the request voltage value, the control voltage value changing in accordance with a change in the request voltage value with keeping an equivalent amount of a margin to the additional voltage value to the request voltage value, and outputs the control voltage value to a power-supply apparatus which supplies a driving voltage to the electronic device.

2. The power-supply control apparatus according to claim 1, wherein the electronic device changes the request voltage value in accordance with the operational state thereof.

3. The power-supply control apparatus according to claim 1, further comprising:
a first signal converting circuit that converts the request voltage value, which is output from the electronic device as a parallel signal, into a serial signal and outputs the serial signal to the adding unit; and
a second signal converting circuit that converts the control voltage value, which is output from the adding unit as a serial signal, into a parallel signal and outputs the parallel signal to the power-supply apparatus.

4. The power-supply control apparatus according to claim 1, wherein the adding unit adds respective additional voltage values to request voltage values that are output from respective electronic devices, thereby calculating control voltage values, and then outputs the control voltage values to respective power-supply apparatuses that correspond to the respective electronic devices.

5. The power-supply control apparatus according to claim 1, further comprising a connector that connects the adding unit in a detachable manner.

6. The power-supply control apparatus according to claim 1, further comprising a switch circuit that selectively outputs either the request voltage value or the control voltage value to the power-supply apparatus.

7. A power-supply control method comprising:
reading a request voltage value output from an electronic device;
calculating a control voltage value by adding a predetermined setting value to the request voltage value, the control voltage value changing in accordance with a change in the request voltage value with keeping an equivalent amount of a margin to the predetermined setting value to the request voltage value; and
outputting the control voltage value to a power-supply apparatus which supplies a driving voltage to the electronic device.

8. A power-supply control apparatus comprising:
a memory; and
a processor coupled to the memory, wherein the processor executes a process comprising:
setting an additional voltage value added to a request voltage value that is output from an electronic device;
calculating a control voltage value by adding the additional voltage value to the request voltage value, the control voltage value changing in accordance with a change in the request voltage value with keeping an equivalent amount of a margin to the additional voltage value to the request voltage value; and
outputting the control voltage value to a power-supply apparatus which supplies a driving voltage to the electronic device.

* * * * *